United States Patent
Huang et al.

(10) Patent No.: US 9,760,138 B2
(45) Date of Patent: Sep. 12, 2017

(54) LOAD SCHEDULING IN MULTI-BATTERY DEVICES

(71) Applicant: Microsoft Technology Licensing, LLC, Redmond, WA (US)

(72) Inventors: Bojun Huang, Beijing (CN); Julia L. Meinershagen, Seattle, WA (US); Thomas Moscibroda, Beijing (CN); Stephen E. Hodges, Cambridge (GB); Ranveer Chandra, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 596 days.

(21) Appl. No.: 14/262,205

(22) Filed: Apr. 25, 2014

(65) Prior Publication Data

US 2015/0309547 A1    Oct. 29, 2015

(51) Int. Cl.
  *G06F 1/26* (2006.01)
  *H02J 7/00* (2006.01)
  *H02J 7/34* (2006.01)

(52) U.S. Cl.
  CPC .......... *G06F 1/263* (2013.01); *H02J 7/0063* (2013.01); *H02J 7/0068* (2013.01); *H02J 7/34* (2013.01); *H02J 2007/0067* (2013.01)

(58) Field of Classification Search
  CPC ..................................... G06F 1/263
  USPC ........................................ 307/80
  See application file for complete search history.

(56) References Cited

U.S. PATENT DOCUMENTS

| 8,508,191 B2 | 8/2013 | Kim et al. |
| 2007/0007823 A1 | 1/2007 | Huang et al. |
| 2008/0176608 A1 | 7/2008 | Budampati et al. |
| 2012/0102407 A1 | 4/2012 | Benario et al. |
| 2012/0102504 A1 | 4/2012 | Iyet et al. |
| 2013/0346762 A1 | 12/2013 | Hodges et al. |

FOREIGN PATENT DOCUMENTS

| EP | 2296246 A2 | 3/2011 |
| JP | 2009278754 A | 11/2009 |

OTHER PUBLICATIONS

Second Written Opinion dated Mar. 29, 2016 for corresponding PCT Application No. PCT/US2015/026052, 6 pages.
International Preliminary Report on Patentability Issued in PCT Application No. PCT/US2015/026052, Mailed Date: Jul. 27, 2016, 8 pages.
International Search Report and Written Opinion Issued in PCT Application No. PCT/US2015/026052, Mailed Date: Jul. 23, 2015, 10 Pages.

(Continued)

*Primary Examiner* — Joseph Chang
(74) *Attorney, Agent, or Firm* — Schwegman Lundberg & Woessner, P.A.

(57) ABSTRACT

Various embodiments provide techniques and devices for scheduling power loads in devices having multiple batteries. Loads are characterized based on the power required to serve them. Loads are then assigned to batteries in response to the type of load and relative monitored characteristics of the batteries. The monitored battery characteristics can change over time. In some embodiments, stored profile information of the batteries can also be used in scheduling loads. In further embodiments, estimated workloads can also be used to schedule loads.

20 Claims, 6 Drawing Sheets

(56) References Cited

OTHER PUBLICATIONS

Benini et al., "Discharge Current Steering for Battery Lifetime Optimization", In Proceedings of the International Low Power Electronics and Design, published Aug. 12, 2002, 6 pgs.
Benini et al., "Extending Life of Portable Systems by Battery Scheduling", In Proceedings Design, Automation and Test in Europe, 5 pgs.
Mandal, "IntellBatt: Towards Smarter Battery Design," In Proceedings of 45th ACM/IEEE Design Automation Conference, 6 pgs.
Vrudhula et al., "Analysis of Discharge Techniques for Multiple Battery Systems", In Proceedings of the International Symposium on Low Power Electronics and Design, Published Aug. 25, 2003, 4 pages.
Wu et al., "An Interleaved Dual-Battery Power Supply for Battery-Operated Electronics", In Proceedings of the Asia and South Pacific Design Automation Conference, Published Jan. 28, 2000, 4 pgs.
Zheng et al., "Enhancing Battery Efficiency for Pervasive Health-Monitoring Systems Based on Electronic Textiles", In Proceedings of IEEE Transactions on Information Technology in Biomedicine, vol. 14, No. 2, 10 pgs.

LOAD SCHEDULING IN MULTI-BATTERY DEVICES

BACKGROUND

Energy efficiency in electronics—particularly those that depend on a finite source for operational power—is an important concern to device engineers and is often a significant limiting factor in the work of product designers. With battery-powered mobile devices becoming ubiquitous in both business and personal settings, the problem of improving energy efficiency remains as important as ever. Accordingly, research and development efforts to enhance energy efficiency in such devices are numerous and varied, ranging from improvements in hardware materials and architecture to operating system scheduling efficiency and improved device resource management at the application level.

Existing systems typically rely on a single power source (e.g. a single battery) from which to draw needed power, regardless of the status of the device's hardware and software functions. Even in the increasingly common systems which use multiple battery cells, the component cells or other divisions of the battery pack are typically treated by the device as a single battery module.

Under the present common single-entity power source paradigm, all power loads from the device are served by the single power source regardless of the type of load (e.g. a background application or process versus a streaming video). Even in systems having multiple, individually accessible battery modules, loads are typically assigned to the batteries in a manner that does not take into account the inherent and varying properties of the batteries. For example, it is typical for all loads to be assigned to a single battery until that battery's energy is exhausted, at which point all loads are assigned to another battery until that one is exhausted, and so on. Other typical systems continuously divide loads up as equally as possible between battery modules such that the state of charge of all batteries available to a system remains substantially uniform, or "balanced".

Systems commonly represented in the art make it difficult or impossible to take into account the varying percentages of wasted energy, which depend in part on the properties of the load and state of the battery, or to take advantage of those known properties when designing a device or system.

SUMMARY

The techniques and devices discussed herein facilitate load scheduling in devices having more than one battery module. The techniques enable a load scheduling module to schedule loads in a device between multiple batteries in a way that can increase efficiency by reducing overall energy consumption of a device, thus prolonging the life time of the device and its batteries. The load scheduling module can take advantage of physical properties of different batteries in a system by assigning loads in response to a number of different battery and load characteristics.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or technique(s) as permitted by the context above and throughout the document.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Overview

Figure 1:
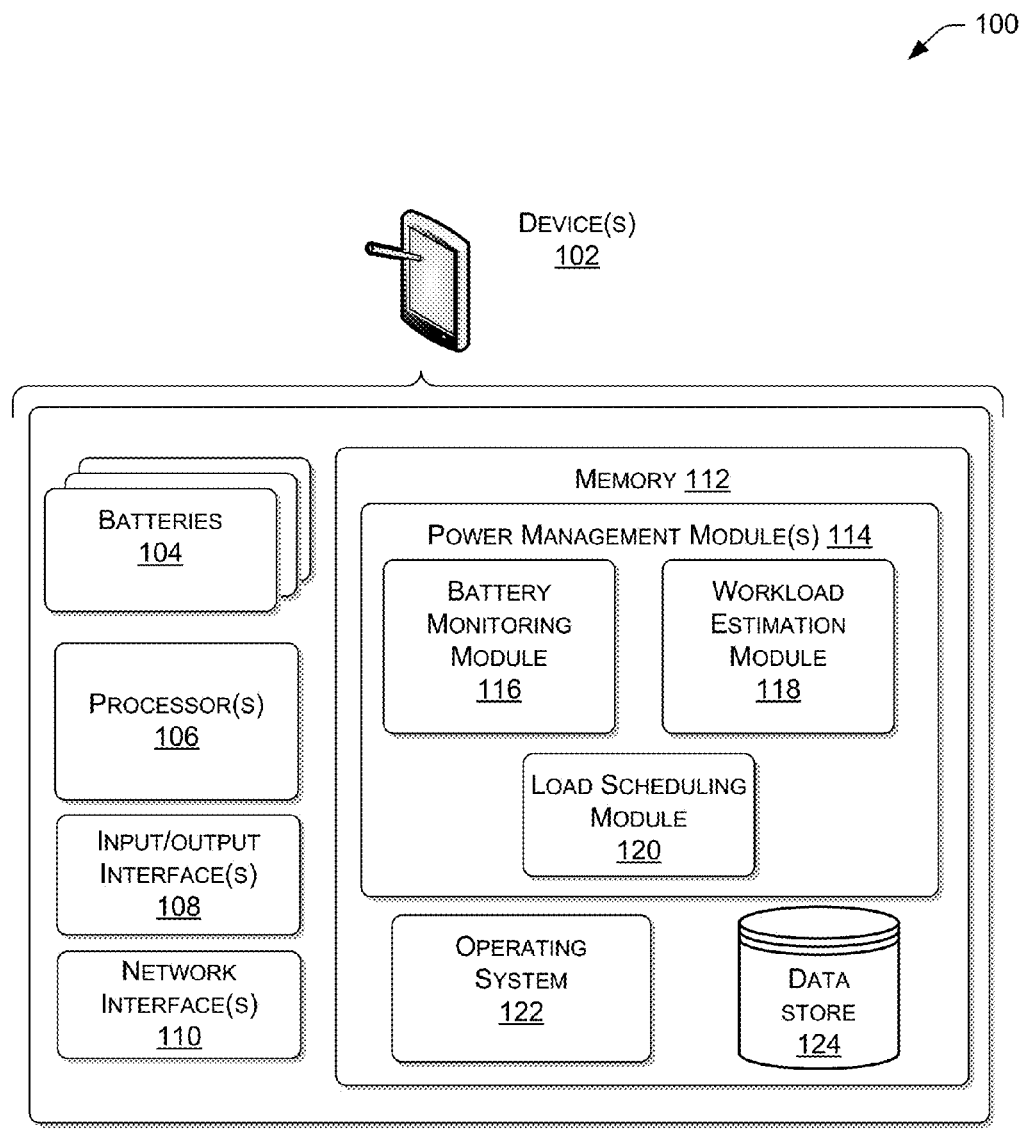
FIG. 1 is a block diagram depicting an example environment in which embodiments of load scheduling in multi-battery devices can operate.

Embodiments described herein provide techniques and devices for scheduling power loads in devices having more than one power module, for example multi-battery smart phones, tablet computers, laptop and desktop computers, e-book readers, entertainment devices, wearable devices, sensor nodes, and other devices that can be powered by more than one battery module. A "load" in such devices can be conceptualized as any function of the device that requires electrical power from the device's power module(s) in order to be completed. In various embodiments, a load can correspond to any combination of, for example, processor functions, user activities, user applications, operating system or kernel processes, input/output processes and devices, memory processes, and data storage hardware. More specifically, the term "load" may refer to the concept of electric load caused by one of the processes, functions, or hardware elements listed above, to the load-causing process, function, or hardware element itself, or both.

A battery or battery module for purposes of this disclosure may refer to any finite power source that functions, from the device and/or a load scheduling module's perspective, as a unitary entity. For example, a battery module may mean a single battery cell or a large network of battery packs, each containing many cells. The term "battery module" may also apply to any other non-infinite source of energy or power available to a device, such as a capacitor, super capacitor, fuel cell, or any other chemical, thermal, or mechanical energy storage module.

Whenever any device draws power, only a fraction of the energy drawn actually becomes "useful" in the sense that it is applied directly to powering the functional parts of a device (i.e. the loads). A considerable portion of the power drawn is lost to inefficiencies in the device—whether they be caused by physical transfer of the power, properties of the materials used in the device, characteristics of the battery pack, or inefficiencies in the operational design of the device's hardware and software.

Two important factors in determining how much power becomes wasted energy in a battery are the internal resistance of the battery and the power of the load. Wasted energy is generally considered to be energy that does not reach functional parts of a system or device, while useful energy is energy from the battery that does act, as intended, to provide power directly to processes, functions, or hardware elements of the device. Energy that is "useful" from a battery management perspective can still be "lost" as a result of other inefficiencies inherent in the functional area of a device the useful energy reaches (e.g. heat generated in a processor or display), but such energy can still be considered useful energy because it was not "wasted" before reaching its intended function within a device. From the perspective of improving efficiency of load scheduling specifically, energy that is wasted only after reaching other functional components of the system or device (e.g. energy that is wasted as a result of inefficiencies inherent in various device hardware or inefficient software algorithms not related to load scheduling) should generally not be considered "wasted" from the perspective of a load scheduling modules or algorithm. Internal resistance can depend on many factors, including the state of charge of the battery, the chemical composition of the active battery materials, age of the battery, how many discharge cycles the battery has completed, and the temperature of the battery, among others. State of charge (how much charge remains in the battery) is closely correlated with the battery's internal resistance in typical batteries used, for example, in contemporary mobile devices.

It is well known that high-power loads cause more wasted energy in a battery than relatively lower-power loads. For example, consider two different states of a mobile device: (1) viewing a video and (2) standby mode. The power consumption of viewing a video is high, requiring powering the display and processor-intensive video rendering. In contrast, standby mode uses only minimal background processing and generally does not require the display to be operational. But, not only is the power requirement higher for viewing a video, but the percentage of energy in the battery that is wasted is also higher compared to standby mode or any other activity with a lower power requirement than watching a video. These principles and the inventions described herein are scalable and apply to other systems with much higher or lower power requirements. For example, in an electric or hybrid vehicle, acceleration of the vehicle can be considered a relatively high-power state, while idling at a stop light can be considered a relatively low power state.

Wasted energy also depends on the internal resistance (also called DC internal resistance or DCIR) of the battery. In general, the higher the internal resistance of a battery, the more energy will become wasted energy as opposed to becoming useful energy that ends up powering the functional parts of a device. As a simplified explanation of this phenomenon, consider a battery as an equivalent circuit consisting of an ideal power source of voltage V and a resistor of resistance R, representing the battery's internal resistance. By Ohm's Law, the wasted energy inside the battery equals the square of the current multiplied by the internal resistance, multiplied by the time duration:

$$E_{waste} = I^2 RT$$

Therefore, for a given power of the load, the higher the internal resistance R, the higher the wasted energy.

As a practical matter, the state of charge of a battery is closely related to internal resistance for the batteries typically in use today. Experimental results show that when a battery becomes empty, its internal resistance becomes larger. Consequently, the wasted energy also becomes larger. These observations lead to the generalized principle that a low state of charge of the battery will cause more wasted energy (for the same load). In other words, the emptier the battery, the more the wasted energy, while the fuller the battery, the less the wasted energy.

In contrast to previous approaches, the techniques and devices discussed herein are designed to take advantage of inherent properties of batteries in order to schedule loads between multiple batteries in a device in response to the type of load and various characteristics of the batteries themselves.

In various embodiments, each load is characterized based on the power required to serve the load, and the load characterization information can be provided to the load scheduling module. Each of the batteries in a device can be monitored for various parameters at any given time. For example, the internal resistance of a battery can be measured and/or estimated. Similarly, the state of charge of a battery can be measured and/or estimated. Other parameters such as composition, temperature, and age of the battery, and/or the number of discharge cycles the battery has completed can be monitored and provided to the load scheduling module.

In various embodiments, the load scheduling module selects, or "schedules" a battery to handle individual loads based on the load characterization and the monitored parameters of the batteries.

In some embodiments, the load scheduling module schedules loads according to a "greedy" algorithm. In some embodiments employing a greedy algorithm, an individual load is characterized as either low-power or high-power. Low-power loads can then be assigned to a battery with higher internal resistance relative to other batteries in the device, and high-power loads assigned to a battery with lower internal resistance relative to other batteries in the device.

In some embodiments, the load scheduling module schedules loads according to a threshold algorithm. In some embodiments employing a threshold algorithm, an energy threshold T can be calculated or pre-defined. In some embodiments, a threshold algorithm can assign all or a majority of loads to a first battery until the cumulative energy output of the first battery exceeds the threshold T. In some embodiments, after the cumulative energy output of the first battery has exceeded the threshold T, all or a majority of low-power loads can be assigned to a battery with a higher internal resistance relative to other batteries in the system, and all or a majority of high-power loads can be assigned to a battery with a lower internal resistance relative to other batteries in the system.

In further embodiments, stored information or profiles about batteries in the system can be provided to or accessed by a load scheduling module. In some embodiments, an estimated workload can be calculated and provided to the load scheduling module. In some embodiments, the load scheduling module can use any combination of monitored battery parameters, load characterization, estimated workload, stored battery information or profiles, or other information to make load scheduling decisions.

Various embodiments are described in further detail with reference to FIGS. 1-6.

Illustrative Environment

FIG. 1 is a block diagram depicting an example environment in which embodiments of load scheduling in multi-battery devices can operate. FIG. 1 illustrates an example computing-based system, represented by device 102, such as an electronic consumer device (e.g. a mobile phone, laptop computer, tablet computer, e-book reader, or other portable computing device), which comprises multiple batteries 104 and which is arranged to adaptively control which of the multiple batteries 104 handles a particular device load based on one or more different factors. A load can be any function of the system or device 102 that requires power to complete. For example, operating a processor or display, operating system or application processes, or any user application are examples of loads.

A load scheduling module 120 makes decisions—which can be called "scheduling decisions"—about which battery or batteries 104 should process which specific loads. Examples of factors considered to make scheduling decision factors include, but are not limited to: monitored parameters of the batteries 104 (e.g. state of charge, temperature, age, number of discharge cycles, etc.), stored information about batteries 104, the type of load(s) to be scheduled, and known or predicted future workload.

In various examples, the batteries 104 can all be of the same type—each battery cell may use the same battery technology and any suitable battery technology can be used. Examples of battery technologies include, but are not limited to: lithium-ion, lithium-polymer and lithium iron phosphate ($LiFePO_4$) chemistries, supercapacitors (also known as ultracapacitors) and fuel cells. In other examples, the plurality of batteries 104 within the computing-based device 102 may comprise battery cells of different types. In some examples, batteries 104 may have substantially different characteristics, including, e.g. different capacities and different initial and maximal internal resistances.

The computing-based device 102 also comprises one or more processors 106 which can be microprocessors, controllers, or any other suitable type of device for processing computer-executable instructions to control the operation of the device. In some implementations, for example where a system-on-a-chip architecture is used, the processors 106 may include one or more fixed function blocks (also referred to as accelerators) which implement a part of the method of operation in hardware (rather than software or firmware).

Computer-executable instructions can be provided using any computer-readable media that is accessible by computer-based device 102. Computer-readable media may include, for example, computer storage media such as memory 112 and communications media. Computer storage media, such as memory 112, can include volatile and non-volatile, removable and non-removable media implemented in any method or technology for storage of information such as computer-readable instructions, data structures, program modules, or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals can be present in a computer storage media, but propagated signals per se are not examples of computer storage media. Although the computer storage media (memory 112) is shown within the computing-based device 102 it will be appreciated that the storage can be distributed or located remotely and accessed via a network interface 110 or other communication means.

Operational software including an operating system 122 or any other suitable platform software can be provided at the computing-based device 102 within memory 112 to enable operation of the device, including operation of other software-implementable functions. For example, in some embodiments a power management module 114 can be provided, which conceptually may comprise any combination of the load scheduling module 120, a battery monitoring module 116, and a workload estimation module 118. Battery monitoring module 116 can aid the decision making of load scheduling module 120 by providing information about batteries 104 to the load scheduling module 120. Although the concepts of power management module 114, load scheduling module 120, battery monitoring module 116, and workload estimation module 118 are provided for ease and clarity of description, one skilled in the art will understand that these are, fundamentally, abstractions, and that the functions ascribed in this specification to such modules can be performed in any combination of one or more pieces of software code in any language or in one or more hardware modules, for example a microcontroller, application-specific integrated circuit (ASIC), or field-programmable gate array (FPGA).

The memory 112 may also provide a data store 124 which may, for example, be used to store data processed by, e.g. operating system 122, power management module 114, load scheduling module 120, battery monitoring module 116, and/or workload estimation module 118. In some embodiments, data store 124 includes a hard disk, "flash" drive, or any combination of real or virtual and permanent or temporary storage means. For example, data store 124 may include data storage such as a database, data warehouse, or other type of structured or unstructured data storage. In some embodiments, data store 124 includes a relational database with one or more tables, indices, stored procedures, and so forth to enable data access. Data store 124 can store data for the operations of processes, applications, components, and/or modules stored in memory 112 and/or executed by processor(s) 106.

Device(s) 102 can further include one or more input/output (I/O) interfaces 108 to allow device 102 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Device 102 can also include one or more network interfaces 110 to enable communications between computing device 102 and other networked devices such as other device(s) 102 over an external network, such as a wireless network. Such network interfaces 110 can include one or more network interface controllers (NICs) or other types of transceiver devices to send and receive communications over a network.

Additional description of elements shown in FIG. 1 appears below.

Illustrative Operational Relationships

Figure 2:
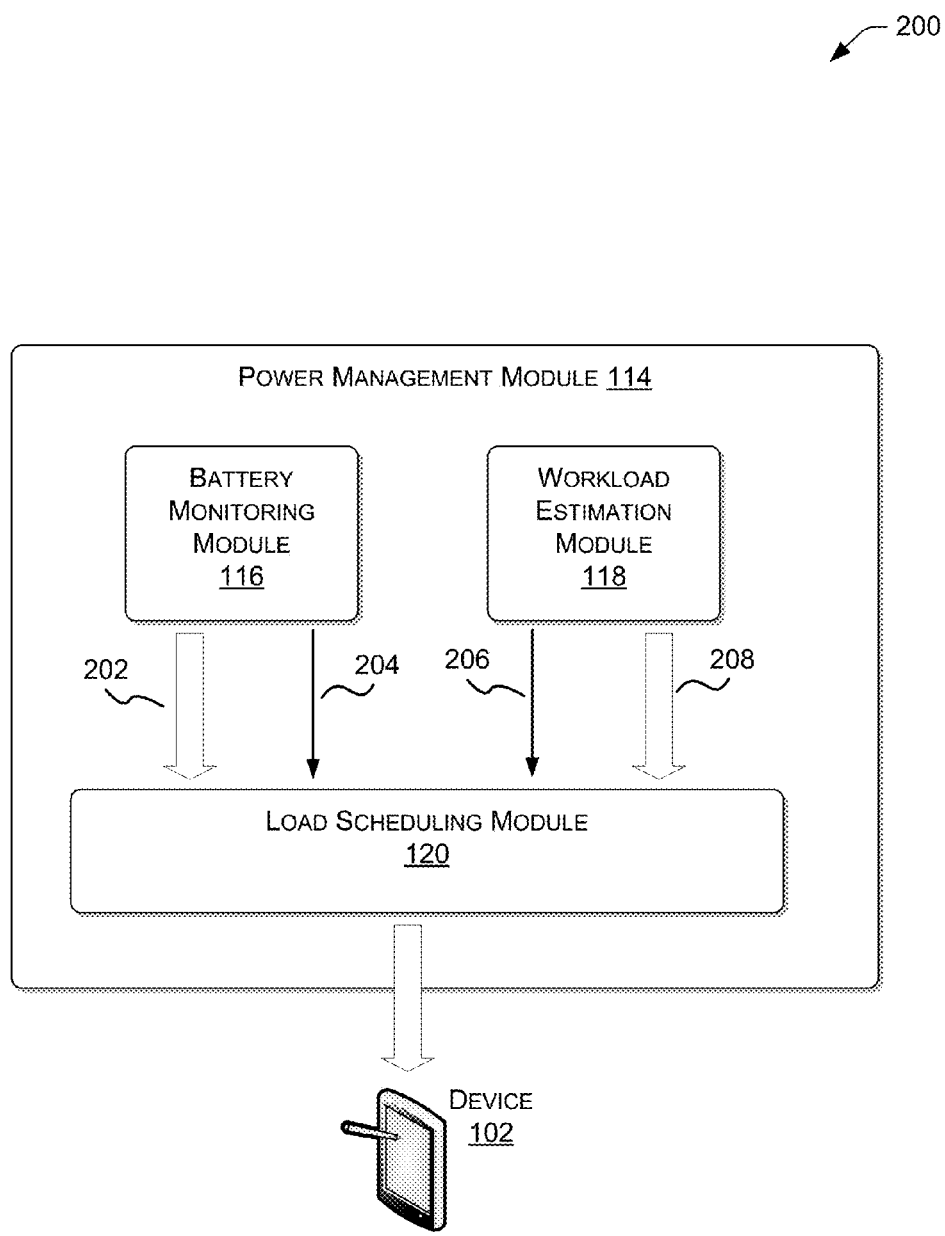
FIG. 2 is a system block diagram depicting an example power management module employing battery monitoring and workload estimation modules, both of which provide information to a load scheduling module, according to some embodiments.

FIG. 2 is a system block diagram depicting an example power management module employing battery monitoring and workload estimation modules, both of which provide information to a load scheduling module, according to some embodiments.

In some embodiments a power management module 114 can be provided, which conceptually may comprise any combination of the load scheduling module 120, a battery monitoring module 116, and a workload estimation module 118. A load scheduling module 120 makes decisions—which can be called "scheduling decisions"—about which battery or batteries 104 should process which specific loads. Examples of factors considered to make scheduling decision factors include, but are not limited to: monitored parameters of the batteries 104, stored information about batteries 104, the type of load(s) to be scheduled, and known or predicted future workload.

Battery monitoring module 116 and workload estimation module 118 can aid the decision making of load scheduling module 120 by providing information about batteries 104 to the load scheduling module 120.

Information provided by battery monitoring module 116 to load scheduling module 120 can comprise information 202 about present states of parameters related to batteries 104 of device 102. In some embodiments, example state information 202 may include internal resistances, states of charge, age, number of discharge cycles completed, measures of energy remaining within and expended from, and temperature. In some embodiments, battery monitoring module 116 can also provide pre-stored characteristic information 204 about batteries 104 to load scheduling module 120. For example, discharge profiles can be provided for batteries 104 showing internal resistance as a function of state of charge, or vice-versa. Any number of other profile types can be provided, including, for example, battery resistance as a function of energy output, state of charge as a function of energy output, and modifications thereof based on temperature, age, number of discharge cycles, and other parameters. Other examples of stored information about batteries 104 that can be provided are initial resistances (e.g. internal resistance at full charge) and maximal resistances (e.g. internal resistance at full discharge). In some embodiments, stored characterization information 204 can be augmented or modified in response to information accessed and/or data generated as a result of the functioning of load scheduling module 120 or power management module 114.

Information provided by workload estimation module 118 to load scheduling module 120 can, in some embodiments, include a type characterization 208 of power loads necessary for operating of device 102. In various embodiments, a load can correspond to any combination of, for example, processor functions, user activities, user applications, operating system or kernel processes, input/output processes and devices, and memory processes and devices. For example, some embodiments may employ a load characterization scheme whereby loads are characterized by, for example, the total amount of power required to complete a load or by the amount of power a load requires over a period of time. In such an example embodiment, an activity comprising streaming video processing and powering an input/output device to display the streaming video to a user can be characterized as a high-power load in some embodiments. Similarly, a background operating process that runs during a standby mode of device 102 can be characterized as a low-power load in some embodiments. In some embodiments, other load characterization schemes can be based on different criteria, for example: whether the load is hardware or software based, which component of device 102 requests and/or processes the load, whether the results of a process are apparent to a user of device 102, and other criteria.

An example load type characterization scheme according to some embodiments can use any number of possible type characterizations. For example, a load type rating scheme that characterizes loads based on power required over a period of time can rate all loads as low-power or high-power loads. Alternatively, other embodiments of such a scheme can include ten (or any other number of) levels of load type ratings based on the power requirements of a load over a period of time.

Information provided to load scheduling module 120 according to some embodiments can also include an estimated workload 208. In some embodiments, a future workload can be estimated by workload estimation module 118 and provided to or accessed by load scheduling module 120. In example embodiments, a future workload can be calculated, for example, for the period of time until device 102 no longer has loads requiring power to be transferred from batteries 104 (e.g. because the device has been powered off or has been plugged into a charger), for a period until the energy in each battery 104 has been exhausted, or for a particular discrete period of time, among other periods.

In some embodiments, an example workload of the system or device 102 in one discharging cycle can be the trace of the "useful" power consumption over time in that cycle. For example, at any time t, the useful power consumption $P(t)$ can be measured by monitoring the terminal voltage of a battery 104 and the direct current from that battery. An example system can discretely quantize a workload in both the power dimension and time dimensions. In the power dimension, example systems can use, e.g. clustering techniques or predetermined thresholds to quantize the workload into two power levels, high-power and low-power, which roughly correspond to the active state and standby state of the device, respectively. In the time dimension, example systems may partition the workload into a sequence of discrete "loads" and make scheduling decisions only at the boundary of loads. That is, e.g. a load can be assigned to a particular battery and that battery would process the load until the load is finished or the energy in the battery is extinguished. In some embodiments where scheduling decisions are made only at the boundary of loads, the load scheduling module 120 can make a scheduling decision only when a new load is presented for scheduling or when a previously scheduled load is re-presented for scheduling due to its finishing on the originally assigned load becoming impossible (e.g. the originally assigned battery has become fully discharged).

In some embodiments, the load partitioning is not uniform in time, but uniform in (useful) energy consumption. As a result, in such embodiments, the time duration for a low-power load will be longer than the time duration to complete a high-power load, because the high-power load would use up the prescribed quantity of energy faster than a low-power load would. As a result, such example embodiments in general can require less frequent switching of batteries when the device is in standby or another low-power mode. Such a design can help ensure that the energy overhead of load scheduling is always limited to a small fraction of the total energy consumption.

In some embodiments, power levels of loads can be quantized by the power threshold P*, and energy levels of loads can be quantized by the threshold E*. In some embodiments, at the beginning boundary of a load (e.g., when the load requires power and is presented to load scheduling module 120 for a battery assignment), workload estimation module 118 can predict an estimated average power consumption of the load over a time duration before an amount of E*mJ of useful energy will be consumed. In such an example system, if the average power consumption is expected to be above P*, then the load presently being characterized (e.g., the present load) is a high-power load. Otherwise, the load presently being characterized is a low-power load. Load scheduling module 120 can then use the characterization information to assign (by any of the processes described in detail herein) a specific battery 104 to handle the present load. In some embodiments where there are more than two levels, this process would repeat at each load boundary.

Illustrative Processes

Figure 3:
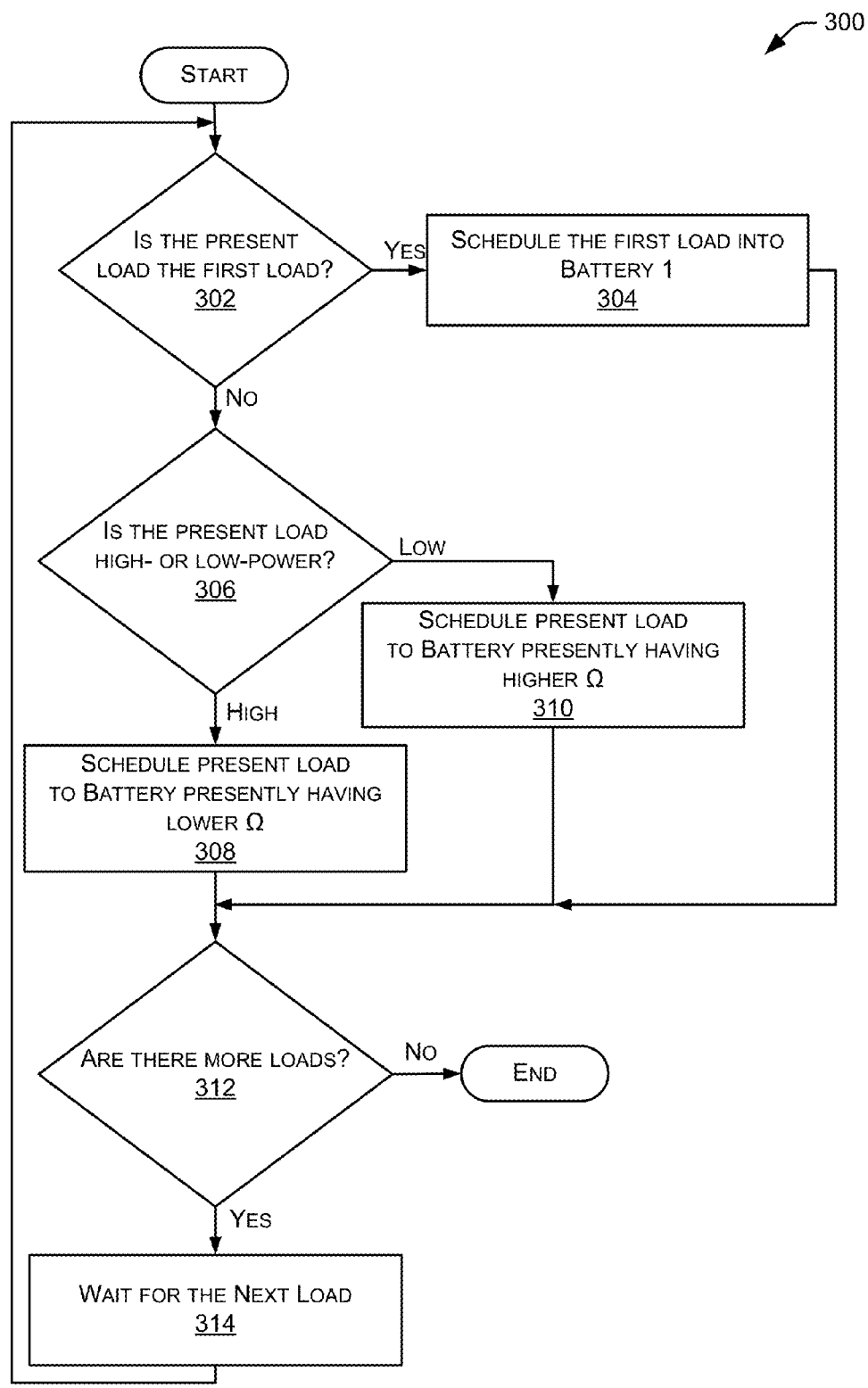
FIG. 3 is a flow chart of an example greedy scheduling algorithm for scheduling power loads, according to some embodiments.

FIG. 3 is a flow chart of an example greedy scheduling algorithm for scheduling power loads, according to some embodiments. In various embodiments, the processes of FIG. 3 can be performed substantially by load scheduling module 120 or by any combination of power management module 114, load scheduling module 120, battery monitoring module 116, workload estimation module 118, and other tangible or abstract software or hardware modules or devices.

The "greedy" scheduling algorithm, an example of which is represented by the flow chart of FIG. 3, can be applied in some embodiments to a special case load scheduling system utilizing a binary load characterization method (e.g., loads can be characterized only as low-power or high-power) and two identical battery modules.

According to various embodiments that utilize the algorithm of FIG. 3 or a similar algorithm, batteries 104 comprise two identical battery modules, Battery 1 and Battery 2. For example, identical battery modules are substantially identical in structure and all relevant functional parameters such as capacity, physical structure and materials, active cathode material chemistry, form factor, monitoring and communication capabilities, and method(s) of communication and electrical coupling with device 102.

According to various embodiments that utilize an algorithm identical or similar to that represented by FIG. 3, load scheduling module 120 and/or workload estimation module 118 can characterize each load in a binary manner, meaning only two distinct characterizations are possible. For example, in some embodiments loads can be characterized as low-power or high-power. In other embodiments, loads can be characterized as active or background processes, as apparent or not apparent to the user; as relating to software or hardware, or any other possible binary distinction.

In some embodiments, a greedy load scheduling algorithm could always schedule the first load (or alternatively the first high-power or low-power load) to be powered by Battery 1. For all subsequent loads in some embodiments, each high-power load could be scheduled to be powered by the battery presently having the lowest internal resistance while each low-power load could be scheduled to be powered by the battery presently having the highest internal resistance. In some embodiments, when all loads requiring battery power have been processed (or, e.g., the energy in all batteries has been exhausted), the scheduling system ends.

In example embodiments, each load requiring power from a battery can be presented individually to load scheduling module 120. At step 302, the load scheduling module 120 and/or workload estimation module 118 determine whether the present load is the first load. In example embodiments, if the present load is the first load, the present load will always be scheduled to Battery 1 (step 304). In other example systems, the first load can always be scheduled to Battery 2, or the first load can be scheduled randomly to a battery.

In some embodiments, if the determination at step 302 is answered in the negative (e.g. the present load is not the first load), a determination is made at step 306 whether the present load is high-power or low-power. In some embodiments, the determination of step 306 can be made by, for example, workload estimation module 118, load scheduling module 120, or a combination thereof.

In some embodiments, if the present load is characterized at step 306 as a high-power load, the present load is scheduled at step 308 to be served by the battery (Battery 1 or Battery 2 in the case of two identical battery modules) presently having the lower or lowest internal resistance relative to the other battery or batteries in the system. In other example embodiments, battery selection can be based wholly or in part on parameters other than internal resistance, e.g. relative state of charge of the batteries.

In some embodiments, if the present load is characterized at step 306 as a low-power load, the present load is scheduled at step 310 to be served by the battery presently having the higher or highest internal resistance relative to the other battery or batteries in the system.

In some embodiments, after a load is scheduled to a particular battery (e.g. at steps 304, 308, or 310), a determination is made at step 312 whether there are more loads to be scheduled. In some embodiments, the determination at step 312 whether more loads are to be scheduled can be based on a predefined or otherwise known workload. In other embodiments, the determination at step 312 whether more loads are to be scheduled can be based wholly or in part on an estimated future workload, which could be generated by workload estimation module 118, load scheduling module 120, or a combination thereof In some embodiments, if the determination of step 312 is answered in the negative (e.g., there are no more loads actually queued or expected), the scheduling algorithm ends.

In some embodiments, if the determination of step 312 is answered affirmatively (e.g. more loads are actually queued or expected), load scheduling module 120 waits at step 314 for the next load to be presented for scheduling. In some embodiments, upon a next load being presented for scheduling, the algorithm of FIG. 3 returns to step 302 as described herein. In some embodiments, the waiting at step 314 can be limited, for example, automatically ending the scheduling algorithmif no load is presented for scheduling within a defined period of time or, for example, if the energy in one or more battery modules becomes nearly or completely exhausted.

Figure 4:
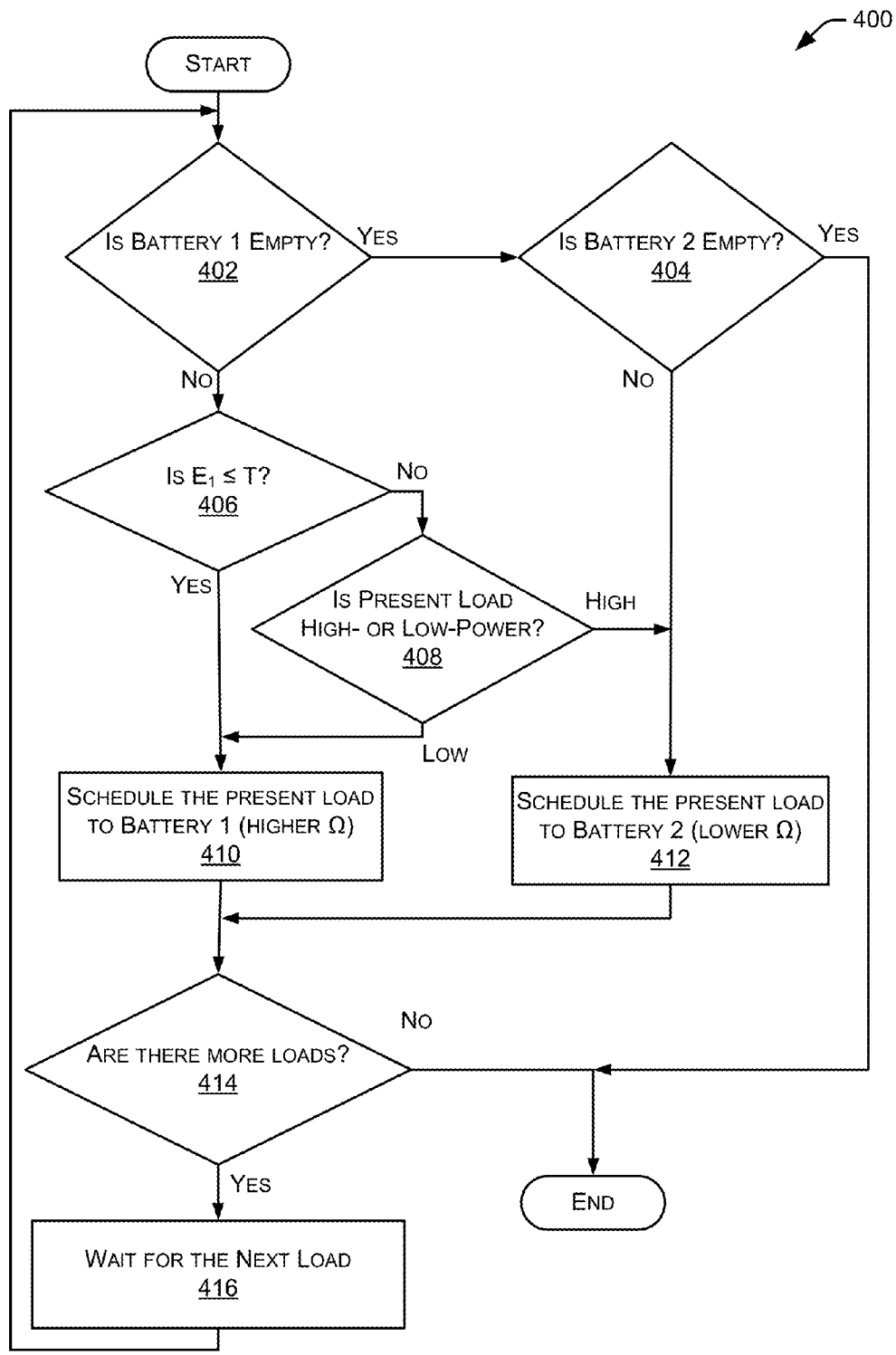
FIG. 4 is a flow chart of an example threshold scheduling algorithm for scheduling power loads, according to some embodiments.

FIG. 4 is a flow chart of an example threshold scheduling algorithm for scheduling power loads, according to some embodiments. In various embodiments, the processes of FIG. 4 can be performed substantially by load scheduling module 120 or by any combination of power management module 114, load scheduling module 120, battery monitoring module 116, workload estimation module 118, and other tangible or abstract software or hardware modules or devices.

The "threshold" scheduling algorithm, an example of which is represented by the flow chart of FIG. 4, can be applied in some embodiments to a special case load scheduling system utilizing a binary load characterization method (e.g., loads can be characterized only as low-power or high-power) and two identical battery modules.

According to various embodiments that utilize the algorithm of FIG. 4 or a similar algorithm, batteries 104 comprise two identical battery modules, Battery 1 and Battery 2. For example, identical battery modules are substantially identical in structure and all relevant functional parameters such as capacity, physical structure and materials, active cathode material chemistry, form factor, monitoring and communication capabilities, and method(s) of communication and electrical coupling with device 102.

According to various embodiments that could utilize an algorithm identical or similar to that represented by FIG. 3 or FIG. 4, load scheduling module 120 and/or workload estimation module 118 can characterize each load in a binary manner, meaning only two distinct characterizations are possible. For example, in some embodiments loads can be characterized as low-power or high-power. In other embodiments, loads can be characterized as active or background processes, as apparent or not apparent to the user; as relating to software or hardware, or any other possible binary distinction that can be imagined by one of ordinary skill in the art.

The conception of a threshold algorithm as illustrated in FIG. 4 and described herein arises in part from the recognition that a greedy algorithm, similar or identical to that illustrated in FIG. 3 and described herein, can offer a greater improvement in efficiency when applied to a system having a relatively larger imbalance of internal resistance between batteries (e.g. one battery in a two-battery system has a significantly higher internal resistance than the other battery) compared to a system having a relatively lower imbalance of internal resistance between batteries. The general principle of a threshold algorithm is to first create an imbalance of internal resistance in a system or device before applying a greedy-style scheduling logic.

To quantitatively evaluate the operational improvement of an example threshold algorithm similar to that illustrated at FIG. 4 and described herein over a simple sequential algorithm (wherein all loads are assigned to Battery 1 until that battery is exhausted, and thereafter all loads are assigned to Battery 2), a simulation was run with battery and system parameters tuned to real-world numbers observed in Windows Phone® and Surface™ (RT and Pro) devices systems. The simulation assumed exactly two identical batteries and a binary load characterization scheme wherein loads were characterized as either low-power or high-power, roughly equating to standby mode and active functions of the simulation devices, respectively.

Simulation results indicate up to 44.1% savings of wasted energy and a 22.6% longer battery lifetime using the threshold algorithm versus a simple sequential algorithm. Those simulated numbers correspond to a simulation of loads in a phone having a battery voltage of 3.7 volts and a current of 2 amps. In a simulated phone having a battery voltage of 3.7 volts and a current of 1 amp, 30% of the wasted energy was saved and an 8.4% longer battery life was observed. In a simulated Surface™ having a battery voltage of 7.4 volts and a current of 3 amps, 30.1% of the wasted energy was saved and a 13.8% longer battery life was observed.

In some example embodiments, load scheduling begins and E1 and E2 can represent the cumulative energy output of Battery 1 and Battery 2, respectively. In such example embodiments, initially both batteries can be substantially fully charged, meaning E1=0 and E2=0. A threshold T is defined to represent a point at which a desired imbalance of internal resistance will be obtained. In some embodiments according to the algorithm of FIG. 4, or a similar algorithm, the threshold load scheduling algorithm can be thought to operate in two "phases." In the first phase, the algorithm attempts to create a sufficiently imbalanced internal resistance (or in other implementations an imbalanced state of charge) between the two batteries by scheduling all loads into Battery 1. Phase 1 ends when $E_1 > T$. In phase 2, low-power loads are scheduled into Battery 1 while high-power loads are scheduled into Battery 2. In some embodiments, when all loads requiring battery power have been processed (or, e.g., the energy in all batteries has been exhausted), the scheduling system ends. In various embodiments, the processes described with regard to the algorithm of FIG. 4 can be performed substantially by load scheduling module 120 or by any combination of power management module 114, load scheduling module 120, battery monitoring module 116, workload estimation module 118, and other tangible or abstract software or hardware modules or devices.

In example embodiments, a load or loads are presented for scheduling, a threshold T is provided, and each load requiring power from a battery can be presented to load scheduling module 120. At step 402, the load scheduling module 120 and/or battery monitoring module 116 determine whether Battery 1 is empty, or substantially or completely discharged. If the determination of step 402 is answered in the affirmative (e.g. Battery 1 is indeed empty), a determination is then made at step 404 whether Battery 2 is also empty, or substantially or completely discharged. If the determination of step 404 is answered in the affirmative (e.g. Battery 2 is empty), then the load scheduling ends because there are no batteries available to provide power to the loads. If the determination of step 404 is answered in the negative (e.g. Battery 2 is not empty) then the present load is scheduled into Battery 2 at step 412, as Battery 2 is the only battery presently available to power the present load.

In some embodiments, if the determination of step 402 is answered in the negative (e.g. Battery 1 is not empty), a determination is made is made at step 406 whether $E_1 \leq T$. If the determination step 406 is answered in the affirmative (e.g., $E_1 \leq T$), the present load is scheduled to Battery 1.

In some embodiments, if the determination step 406 is answered in the negative (e.g. $E_1 > T$), a determination is made at step 408 whether the present load is high-power or low-power. In some embodiments, the determination of step 406 can be made by, for example, workload estimation module 118, load scheduling module 120, or a combination thereof.

In some embodiments, if the present load is characterized at step 406 as a high-power load, the present load is scheduled at step 412 to Battery 2. If the present load is characterized at step 406 as a high-power load, the present load is scheduled at step 410 to Battery 1. In other example embodiments, battery selection can be based wholly or in part on parameters other than internal resistance, e.g. relative state of charge of the batteries.

In some embodiments, after a load is scheduled to a particular battery (e.g. at steps 410 or 412), a determination is made at step 414 whether there are more loads to be scheduled. In some embodiments, the determination at step 414 whether more loads are to be scheduled can be based on a predefined or otherwise known workload. In other embodiments, the determination at step 414 whether more loads are to be scheduled can be based wholly or in part on an estimated future workload, which could be generated by workload estimation module 118, load scheduling module 120, or a combination thereof In some embodiments, if the determination of step 414 is answered in the negative (e.g., there are no more loads actually queued or expected), the scheduling ends.

In some embodiments, if the determination of step 414 is answered affirmatively (e.g. more loads are actually queued or expected), load scheduling module 120 waits at step 416 for the next load to be presented for scheduling. In some embodiments, upon a next load being presented for scheduling, the algorithm of FIG. 4 returns to step 402 as described herein. In some embodiments, the waiting at step 416 can be limited, for example, automatically ending the scheduling if no load is presented for scheduling within a defined period of time or, for example, if the energy in one or more battery modules becomes nearly or completely exhausted.

It is noted and will be recognized by one of ordinary skill in the art that the algorithm shown in FIG. 4 and described herein can be adjusted to meet the particular design and limitations of many systems which can differ from the exact descriptions herein. For example, in phase 1, instead of scheduling all loads into Battery 1, it is also possible to schedule a sufficiently large imbalance between the two batteries by scheduling a majority of loads into Battery 1. Similarly, in phase 2, it is also possible to achieve a greedy-like behavior by scheduling a majority of low-power loads to Battery 1 and a majority of high-power loads to Battery 2.

In some embodiments, load scheduling module 120 can compute an optimal threshold T based on an estimate of the percentage of low-power loads expected to occur in a certain time window in the near future. Specifically, load scheduling module 120 can determine an optimal threshold T at run-time. When the threshold algorithm is in phase 1, load scheduling module 120 can perform a check, for each load presented for scheduling, to determine whether a phase change condition is met. In some embodiments, if a phase change condition is met, the algorithm proceeds automatically to phase 2. In some embodiments, the phase-change check includes simulating a greedy-style algorithm similar to that described in FIG. 3. In the greedy-style algorithm, two events can occur: event 1, when the energy in Battery 1 is exhausted by low-power loads; or event 2, when the state-of-charge of Battery 2 becomes lower than E* ($E_2 < E^*$, where E* is set to $E^* = E_1$ at the beginning of the simulation). The phase-change condition is met if event 1 occurs before event 2 during the simulation.

In further embodiments, the simulation results to check the phase-change condition can be re-used when the algorithm is scheduling the consecutive loads. In other words, for a given load in a sequence of workload, the algorithm need not simulate from scratch. Instead, the algorithm can start the simulation from the status and using parameters from when the simulation ended for the previous load. This property makes the threshold algorithm of some embodiments become essentially a streaming algorithm, which has linear time complexity and constant space complexity, and could be simple enough to implement in hardware circuits. Moreover, in the simulation, which of event 1 and event 2 will happen first depends greatly on the percentage of the low-power loads of the future workload. In systems where the capacity of batteries is large enough, it is reasonable to assume that this percentage tends to be substantially stable, and could be statistically estimated accurately, e.g. by workload estimation module 118.

Figure 5:
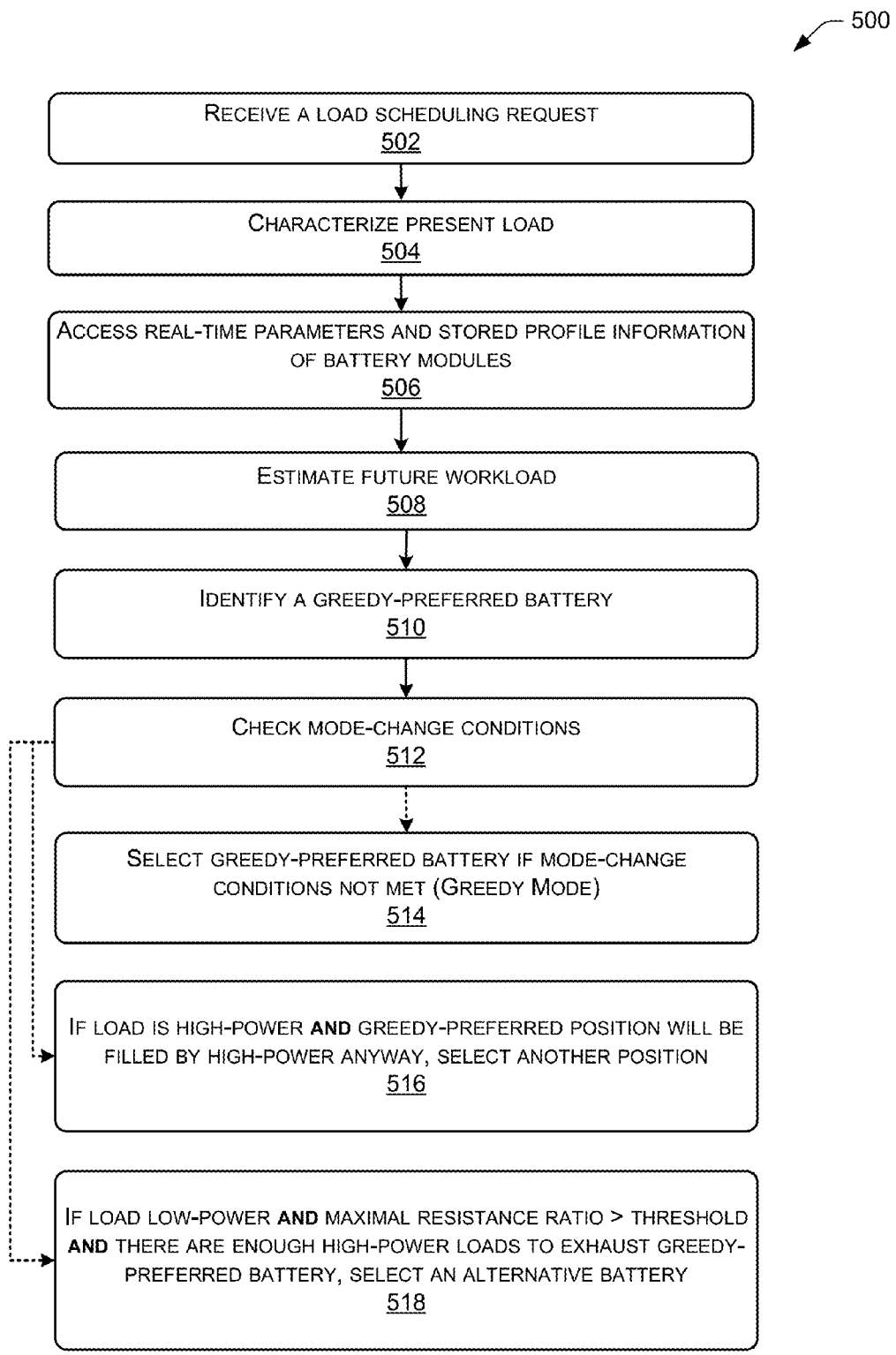
FIG. 5 is a flow diagram illustrating an example hybrid load scheduling process having three scheduling modes, according to some embodiments.

FIG. 5 is a flow diagram illustrating an example hybrid load scheduling process having three scheduling modes, according to some embodiments. In various embodiments, the processes of FIG. 5 can be performed substantially by load scheduling module 120 or by any combination of power management module 114, load scheduling module 120, battery monitoring module 116, workload estimation module 118, and other tangible or abstract software or hardware modules or devices. It is noted and one skilled in the art will understand that many or all of the steps represented in FIG. 5 are ordered in a manner intended to more clearly describe the concepts disclosed herein, but that the relative position of any two steps of FIG. 5 does not necessarily indicate that one of the steps must be performed in time before the other.

The example hybrid load scheduling process having three scheduling modes, represented by the flow chart of FIG. 5 and described herein, can be applied in some embodiments of the present invention. In contrast to the embodiments represented in FIGS. 3 and 4, the example hybrid load scheduling process does not contemplate a system or device powered by two identical battery modules. Rather, any number of battery modules having varying characteristics can be handled.

In some embodiments at step 502, load scheduling module 120 receives a request to schedule a present load. In some embodiments at step 504 load scheduling module 120 and/or workload estimation module 118 characterized the present load according to one or more parameters. An example load type characterization scheme according to some embodiments can use any number of possible type characterizations. In various embodiments, a load can correspond to any combination of, for example, processor functions, user activities, user applications, operating system or kernel processes, input/output processes and devices, and memory processes and devices. For example, some embodiments may employ a load characterization scheme whereby loads are characterized by, for example, the total amount of power required to complete a load or by the amount of power a load requires over a period of time. In such an example embodiment, an activity comprising streaming video processing and powering an input/output device to display the streaming video to a user can be characterized as a high-power load in some embodiments. Similarly, a background operating process that runs during a standby mode of device 102 can be characterized as a low-power load in some embodiments. In some embodiments, other load characterization schemes can be based on different criteria, for example: whether the load is hardware or software based, which component of device 102 requests and/or processes the load, whether the results of a process are apparent to a user of device 102, and other criteria.

In some embodiments, a load type rating scheme that categorizes loads based on power required over a period of time can rate all loads as low-power or high-power loads. Alternatively, other embodiments of such a scheme can include ten (or any other number of) levels of load type ratings based on the power requirements of a load over a period of time.

In some embodiments at step 506, load scheduling module 120 and/or battery monitoring module 116 access real-time parameters and stored profile information of battery modules 104. In some embodiments of the hybrid load scheduling system of FIG. 5, further background information about the battery modules is provided and utilized. Whereas the algorithms of FIGS. 3 and 4 can be implemented by relying primarily on real-time/local information, a hybrid load scheduling system according to some embodiments may use stored profile information about the batteries 104.

In some example embodiments, a battery 'b' can be characterized by an energy output-internal resistance curve $R_b(E)$, which indicates how large the internal resistance $R_b$ is when the battery has cumulatively outputted E Joules of total energy (useful+wasted) in a discharging cycle. In some embodiments, polynomial functions can be used to approximate energy-resistance curves of batteries 104. These energy output-internal resistance curves and polynomial functions are examples of stored profile information that can be useful in making load scheduling decisions.

Figure 6:
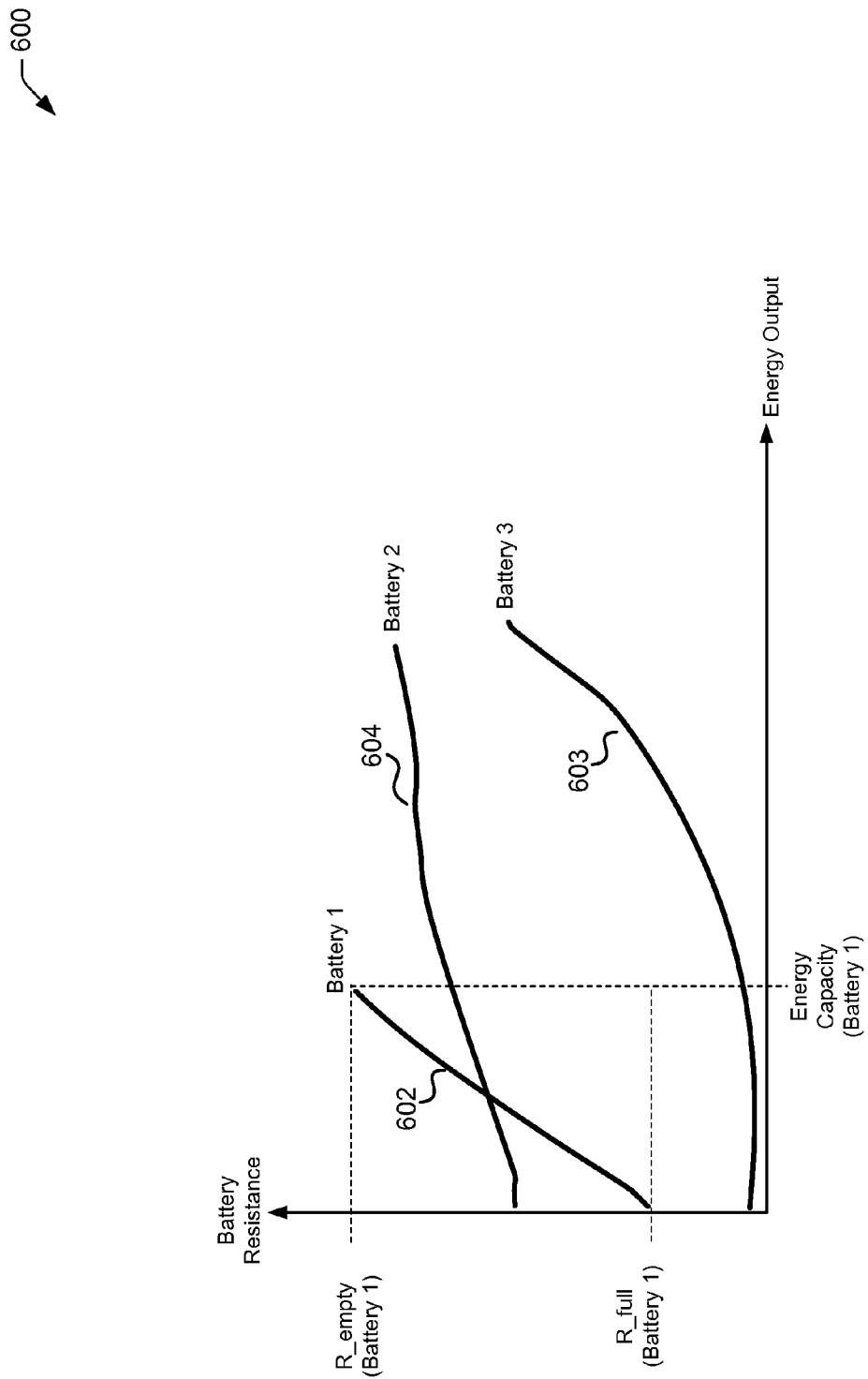
FIG. 6 is a plotted graph showing example battery resistance characteristic curves, according to an example embodiment.

FIG. 6 is a plotted graph 600 showing example battery resistance characteristic curves, according to an example embodiment. Specifically, FIG. 6 shows a plot of an example stored profile of three different batteries available to provide power to a system or device. FIG. 6 plots the energy-resistance curves of each battery in the coordinate space of cumulative energy output and the real-time internal resistance.

In the example embodiment of FIG. 6, the energy-resistance curves of Battery 1 (602) and Battery 2 (604) adhere to a substantially linear function, while the energy-resistance curve of Battery 3 (606) adheres to a substantially exponential function. It is noted and one skilled in the art will recognize, that useful stored profile information, including stored profile curves similar to those represented by FIG. 6, may represent other parameters and parameter comparisons. For example, curves and/or corresponding polynomial functions can be stored to represent state of charge versus energy capacity expended, internal resistance versus state of charge, or other parameters and comparisons. Further, information for modifying the curves based temperature adaptivity, age-adaptivity, or other parameters can be stored.

Referring again to FIG. 5, some embodiments of the example hybrid algorithm are designed, in part, to more efficiently handle the situation where a load is to be scheduled into a system having batteries with substantially the same internal resistance at the present moment in time, but differing energy-resistance curves. Where batteries vary in such parameters as capacity, initial resistance, and maximal resistance, the total increase in resistance caused by a given load can vary considerably between batteries, even where at the moment of load scheduling the batteries in question had substantially similar internal resistances. In such a situation, an algorithm that relies primarily on real-time data such as internal resistance or state of charge at scheduling time will not be able to take into account these differences between batteries.

State-of-charge is not the only factor that can impact an energy-resistance curve. Other factors that can impact the internal resistance of a battery are the battery's temperature, age, and number of discharge cycles completed, among others. In some implementations, the scheduling algorithms of systems as described herein are adjustable to take into account some of these additional factors. For example, in some embodiments, one or more of the modules described herein can calculate adjustments to curves $R_b(E)$ to account for changes in parameters such as temperature and age.

High temperatures generally increase the internal resistance of a battery. In some embodiments, a load scheduling algorithm can adaptively alter a scheduling policy in response to temperature of the batteries 104. For example, one or more adjustment factors or modification constants can be saved for modifying the energy-resistance curve of a given battery based on the temperature of the battery. In other embodiments, a plurality of different energy-resistance curves corresponding to various temperatures can be saved as part of a profile.

If one battery is more sensitive to age-based deterioration than another battery powering the same system or device, a load scheduling algorithm according to some embodiments can modify its scheduling policy to take into account the age of the batteries. For example, the load scheduling algorithm can de-prioritize scheduling to a battery that is old (and thus has a high internal resistance), or to any battery whose recharging will affect the internal resistance more dramatically than will the recharging of a different battery. For example, in some embodiments, a load scheduling algorithm can be adapted by adjusting a mode-switching threshold, by adjusting a power threshold used for characterizing loads, or by determining to schedule certain relatively high-power loads on a battery with higher internal resistance than other batteries in the system (against the general greedy-style logic).

At step 508, load scheduling module 120 and/or workload estimation module 118 estimates a future workload for a set of batteries. In some embodiments, a stochastic workload model can be generated by load scheduling module 120, workload estimation module 118, or a combination thereof A stochastic workload model is defined in some embodiments as a stochastic process from which workload estimation module 118 or load scheduling module 120 can sample instances of future workload (of infinite time-length) starting from a given time. The stochastic process can be non-stationary. For example, in some embodiments, the percentage of low-power loads may depend on the current physical time (e.g. fewer overall load demands or fewer high-power loads at night) and the recent device usage history (e.g. has the device been in standby for a long time?). Although in some embodiments the exact future workload cannot be known or predicted, a stochastic model can be used to estimate the statistical features over all possible future workloads. In some embodiments, for example, a load-scheduling algorithm may depend on the expected time length of low-power and/or high-power loads in a given time window.

According to some embodiments at step 510, a greedy algorithm similar to that presented and described at FIG. 3 is used to choose a "greedy-preferred" battery for the present load. In some embodiments, for a high-power load the greedy-preferred battery would be the battery with the lowest internal resistance at the time of making the scheduling decision, while for a low-power load, the greedy-preferred battery would be the battery with the highest internal resistance at the time of making the scheduling decision.

At step 512 and according to some embodiments, before making a final scheduling decision, load scheduling module 120 checks if any mode-change conditions are present. In some embodiments, if no mode-change conditions are present, the present load is scheduled to the greedy-preferred battery at step 514, and the scheduling request ends.

In some embodiments, at step 516 the present load can be scheduled to a battery other than the greedy-preferred battery provided certain mode-change conditions are present. For some embodiments, with reference to step 516, the required mode change conditions can be that the present load is high-power and the future workload estimation predicts that the greedy-preferred position will be filled by a high-power load anyway if a greedy-logic scheduling algorithm is followed.

In some embodiments, an "invest-vs.-exploit" tradeoff is apparent in scheduling high-power loads. For example, consider a situation where all batteries powering a system have small internal resistances. In general, this is a favorable situation for high-power loads. However, if the present load is a low-power load, it must be scheduled in a position where more energy could have been saved if a high-power load could have been scheduled in the same position.

In some embodiments, an imbalanced situation is desirable for increasing algorithmic efficiency—specifically, where at least one battery in a system has a relatively high internal resistance compared to other batteries. In some embodiments, and as previously described, a load scheduling algorithm can schedule loads in such a way as to intentionally increase an imbalance between batteries—in effect, temporarily acting against greedy-style logic in order to increase the long-term efficiency of a greedy-based scheduling algorithm. In some embodiments, such a situation can be thought of as "investing" towards a better situation, while an alternative—scheduling a high-power load into the battery with relatively lower internal resistance to give better immediate reward in energy savings—can be thought of as "exploiting" a good position.

In some embodiments, the optimality of the threshold algorithms can exhibit an interesting property of the tradeoff unique to the two-identical-batteries setting: once a scheduler has invested enough, it can just keep exploiting in the rest of time, without ever having to return to investing.

In other embodiments, the one-way phase transition is not always observed. For example, in some systems having non-identical or more than two batteries, a load scheduling algorithm can increase efficiency by switching back and forth between investment and exploitation strategies or modes. The scheduler in some such embodiments can still use the same criteria to guide the invest-vs-exploit strategy. Similarly to a threshold algorithm, a load scheduling module according to some embodiments can decide to invest (e.g. to schedule a high-power load in a relatively undesirable position according to an unmodified greedy logic) when the load scheduling module finds that the currently best position will later be filled by another high-power load anyway if a substantially greedy scheduling policy is followed. In such a case, the currently best position can be considered "safe" in some sense because it need not be filled immediately. Instead, the load scheduling module can use the present high-power load to create a better position for subsequent low-power loads.

In some embodiments, a principle of investment can therefore be substantially applied, as used herein. The principle of investment states that for any given position of any given battery, if the position is likely to be filled with a high-power load anyway, then the scheduler should fill the position with a high-power load as late as possible. A corollary statement to the principle of investment according to some embodiments can be said to provide that if the current load is a high-power load and if the currently best position is likely to be filled with a high-power load anyway, then the scheduler should not fill the currently best position with the high-power load immediately. In some embodiments, a guiding strategy for scheduling low-power loads can be substantially the opposite of the one for scheduling high-power loads. Specifically, for any given position of any given battery, if the workload estimation predicts that the position will be filled with a low-power load anyway, then the scheduler should fill the position with a low-power load as soon as possible. A corollary for handing low-power load scheduling can be stated as, if the current load is a low-power load and the workload estimation predicts that the greedy-preferred position will be filled with a low-power load anyway, then the scheduler should fill the greedy-preferred position with the low-power load immediately.

In some embodiments, at step 518 the present load can be scheduled to an alternative battery other than the greedy-preferred battery provided certain mode-change conditions are present. For some embodiments, with reference to step 518, the required mode change conditions can be that the present load is low-power, a ratio of maximal resistance between an alternative battery and the greedy-preferred battery exceeds a threshold, and/or the future workload estimation predicts enough high-power loads to exhaust or nearly exhaust the alternative battery.

In some embodiments, the rule described above for handling low-power loads may not be followed. In some embodiments, particularly where batteries may have different maximal resistances, it can be beneficial to schedule a low-power load in a position other than the greedy-preferred position in order to "reserve" a currently non-preferred position that will become, because of the comparative properties of the batteries, a more efficient position in the future than the currently greedy-preferred position is at the time of the present load scheduling decision. This is because the currently relatively low position (in a greedy-preferred hierarchy) can become a relatively high position in the future, and if there is no high-power load at that future time, it can be possible to realize a great increase in efficiency from having reserved the position.

Consider an example wherein Battery 1 has slightly larger initial-resistance but has much lower maximal-resistance than Battery 2. Also suppose all but the last few loads are low-power loads, and these last few high-power loads exhaust all of the remaining energy in Battery 1. In this example, if the workload starts with some low-power loads, the scheduler should not schedule those initial low-power loads to Battery 1 even though Battery 1 has larger resistance at this time. Instead, it could be more efficient for the scheduler to reserve Battery 1 temporarily, scheduling the first low-power loads to Battery 2 and later filling the last high-power loads in Battery 1.

From the foregoing explanation and example, a principle of reservation for some embodiments can be derived: if an imbalance in maximal resistance between batteries is large enough, and if the scheduler expects enough high-power loads when the energy in all batteries is nearly exhausted, then the scheduler should reserve the battery with smaller maximal resistance for the late high-power loads.

Example pseudo code appears below of specific example embodiments of a hybrid load scheduling algorithm applying the principles of separation, investment, and reservation. Pseudo code 1 introduces inputs, outputs, and function definitions applicable to both Pseudo code 2 and Pseudo code 3. Pseudo code 2 represents an example scheduling algorithm for high-power loads. Pseudo code 3 represents an example scheduling algorithm for low-power loads.

---

Pseudo Code 1

Input:
$R_1, R_2, \ldots, R_k$ as the current resistances of k batteries, sorted in ascending order
$C_1, C_2, \ldots, C_k$ as maximal resistances of the same k batteries, indexed in the same order as resistances $R_i$ -continued Pseudo Code 1

$P_{high}$ as the expected time percentage of high-power loads in a stochastic workload model
Output:
  Battery_Choice
// Calculate the energy capacity of the segment from $R_{begin}$ to $R_{end}$
of battery i, based on the energy-resistance curve of battery i
1  EnergyCapacity(i, $R_{begin}$, $R_{end}$) ;
// Calculate the energy consumption of a load (HIGH or LOW)
when serving by battery i with internal resistance R
2  EnergyConsumption(load_type, i, R) ;
// Calculate the time duration for loads of type load_type to make
the resistance of battery i from $R_{begin}$ to $R_{end}$
3  Duration (load_type, i, $R_{begin}$ , $R_{end}$) ;

Pseudo Code 2

```
//    When the current load is high-power
4        for i ← 1 to k do
5           if EnergyCapacity(i, R_i, C_i) < EnergyConsumption(LOW, i, R_i)
            then
6              continue
7           T_high ← Σ_{t={1 ... i−1}} Duration(HIGH, t, R_t, R_i);
8           T_low ← Σ_{t={i ...k}} Duration(LOW, t, R_t, C_t);
9
            if  T_high / (T_high + T_low)  < P_high  then 10             Battery_Choice ← ; //"invest" the next position level
11          else
12             return ; //"exploit" the current position level
```

Pseudo Code 3

```
// When the current load is low-power
4       for i ← 1 to k do
5          if EnergyCapacity(i, R_i, C_i) < EnergyConsumption(HIGH, i, R_i)
           then
6             continue
7          T_high ← Σ_{t={i... k}} Duration(HIGH, t, R_t, C_t) ;
8          T_low ← Σ_{t={1...i−1}} Duration(LOW, t, C_t, C_t) ;
9
           if  T_high / (T_high + T_low)  < P_high  and  (C_{i−1} − C_i)/(R_i − R_{i−1})  then 10            Battery_Choice ← ; //"invest" the next position level
11         else
12            Battery_Choice ← i − 1; //"exploit" current position level
13            return ;
```

The algorithms of example pseudo codes 1, 2, and 3 can be implemented by any one or combination of load scheduling module 120, battery monitoring module 116, workload estimation module 118, or power management module(s) 114. The algorithms represented can represent a more detailed implementation of the processes and steps shown at FIGS. 3, 4, and 5 and described in detail herein.

Example Clauses

A. A method comprising: monitoring at least one energy source characteristic of at least one of a plurality of finite energy sources; monitoring at least one load characteristic of a present load; selecting one of the plurality of finite energy sources in response to the monitoring at least one energy source characteristic and the monitoring at least one load characteristic; and scheduling the present load to the selected finite energy source.

B. A method, system, or computer-readable media according to clause A, M, or Q, the plurality of finite energy sources comprising a plurality of battery modules.

C. A method according to clause B, the monitoring at least one energy source characteristic comprising calculating a quantity of energy expended from a first battery module; and the selecting one of the plurality of finite energy sources comprising: selecting according to a first selecting mode when the quantity of energy expended from the first battery module is less than or equal to a switching threshold; and selecting according to a second selecting mode when the quantity of energy expended from the first battery module is greater than the switching threshold.

D. A method according to clause C, the monitoring at least one load characteristic comprising determining whether the present load is a low-power load or a high-power load; the first selecting mode comprising selecting the first battery module; and the second selecting mode comprising: selecting the first battery module when the present load is low-power; and selecting the second battery module when the present load is high-power.

E. A method according to clause B, the monitoring at least one energy source characteristic comprising: monitoring at least one state of at least one of the plurality of finite energy sources; and accessing at least one stored characteristic of at least one of the plurality of finite energy sources.

F. A method according to clause E, the at least one state of at least one of the plurality of finite energy sources comprising the value of at least one of an internal resistance, a state of charge, a temperature, an age, or a number of discharge cycles completed of at least one of the plurality of battery modules; and the at least one stored characteristic of at least one of the plurality of finite energy sources comprising stored information of the internal resistance versus an energy output, stored information of the state of charge versus energy output, an initial internal resistance, a maximal resistance of at least one of the plurality of battery modules.

G. A method according to clause F wherein the at least one stored characteristic is augmented or modified in response to a result of a previous application of the method.

H. A method according to clause E, the selecting one of the plurality of finite energy sources further comprising: calculating an estimated future workload; assigning a selection mode for the present load in response to at least one of the estimated future workload, the monitoring at least one energy source characteristic, or the monitoring at least one load characteristic; and selecting the one of the plurality of finite energy sources according to the assigned selection mode.

I. A method according to clause H, the monitoring at least one load characteristic comprising determining whether the present load is a low-power load or a high-power load; wherein the assigned selection mode comprises a separation mode, an investment mode, or a reservation mode.

J. A method according to clause I, the investment mode comprising: applying a greedy algorithm to choose a greedy-preferred battery from the plurality of battery modules; selecting as the selected finite energy source the greedy-preferred battery when the present load is low-power and the estimated future workload predicts that a presently available position of the greedy-preferred battery will be filled with a low-power load regardless of the present selection; and selecting as the selected finite energy source a finite energy source other than the greedy-preferred battery when the present load is high-power and the estimated future workload predicts that a presently available position of the greedy-preferred battery will be filled with a high-power load regardless of scheduling decisions.

K. A method, system, or computer-readable media according to clause I, P, or S, the reservation mode comprising: identifying a first battery module and a second battery module, the first battery module having an internal resistance higher than an internal resistance of the second battery module and a first-battery maximal resistance lower than a second-battery maximal resistance of the second battery; and selecting as the selected finite energy source the second battery module when the present load is low-power, the ratio of the second-battery maximal resistance to the first-battery maximal resistance exceeds a maximal resistance imbalance threshold, and the estimated future workload predicts a quantity of high-power loads sufficient to fill a remaining capacity of the first battery module.

L. A method, system, or computer-readable media according to clause I, P, or S, the separation mode comprising: identifying a first battery module and a second battery module, the first battery module having an internal resistance higher than an internal resistance of the second battery module; selecting as the selected finite energy source the first battery module when the present load is low-power; and selecting as the selected finite energy source the second battery module when the present load is high-power.

M. A system comprising: at least one computing device coupled to a plurality of finite energy sources configured to provide power to the at least one computing device; a battery monitoring module configured to monitor at least one energy source characteristic of at least one of the plurality of finite energy sources; a load characterization module configured to monitor at least one load characteristic of a present load; and a load scheduling module configured to: select one of the plurality of finite energy sources in response to at least one of data provided to the load scheduling module by the battery monitoring module or data provided to the load scheduling module by the load characterization module; and schedule the present load to the selected finite energy source.

N. A system according to clause M, the plurality of finite energy sources comprising a plurality of battery modules.

O. A system according to clause N wherein: the battery monitoring module is further configured to: monitor at least one state of at least one of the plurality of finite energy sources; and access at least one stored characteristic of at least one of the plurality of energy sources; and the load scheduling module is further configured to: calculate an estimated future workload; assign a selection mode for the present load in response to at least one of the estimated future workload, the data provided by the battery monitoring module, or the data provided by the load characterization module; and select the one of the plurality of finite energy sources according to the assigned selection mode.

P. A system according to clause O wherein the load characterization module is further configured to characterize the present load as a low-power load or a high-power load; and wherein the assigned selection mode comprises a separation mode, an investment mode, or a reservation mode.

Q. One or more computer-readable media having computer-executable instructions recorded thereon, the computer-executable instructions configured to, when executed by a computing system associated with a plurality of finite energy sources, cause the computing system to perform operations comprising: monitoring at least one energy source characteristic of at least one of the plurality of finite energy sources; monitoring at least one load characteristic of a present load; selecting one of the plurality of finite energy sources in response to the monitoring at least one energy source characteristic and the monitoring at least one load characteristic; and scheduling the present load to the selected finite energy source.

R. A computer-readable storage media according to clause Q wherein the monitoring at least one energy source characteristic comprises: monitoring at least one state of at least one of the plurality of finite energy sources; and accessing at least one stored characteristic of at least one of the plurality of finite energy sources; and wherein the selecting one of the plurality of finite energy sources further comprises: calculating an estimated future workload; assigning a selection mode for the present load in response to at least one of the estimated future workload, the monitoring at least one energy source characteristic, or the monitoring at least one load characteristic; and selecting the one of the plurality of finite energy sources according to the assigned selection mode.

S. A computer-readable storage media according to clause R wherein the monitoring at least one load characteristic comprises determining whether the present load is a low-power or a high-power load; and wherein the assigned selection mode comprises a separation mode, an investment mode, or a reservation mode.

T. A computer-readable storage media according to clause S, the plurality of finite energy sources comprising a plurality of battery modules; the investment mode comprising: applying a greedy algorithm to choose a greedy-preferred battery from the plurality of battery modules; selecting as the selected finite energy source the greedy-preferred battery when the present load is low-power and the estimated future workload predicts that a presently available position of the greedy-preferred battery will be filled with a low-power load regardless of the present selection; and selecting as the selected finite energy source a finite energy source other than the greedy-preferred battery when the present load is high-power and the estimated future workload predicts that a presently available position of the greedy-preferred battery will be filled with a high-power load regardless of scheduling decisions; the reservation mode comprising: identifying a first battery module and a second battery module, the first battery module having an internal resistance higher than an internal resistance of the second battery module and a first-battery maximal resistance lower than a second-battery maximal resistance of the second battery; and selecting as the selected finite energy source the second battery module when the present load is low-power, the ratio of the second-battery maximal resistance to the first-battery maximal resistance exceeds a maximal resistance imbalance threshold, and the estimated future workload predicts a quantity of high-power loads sufficient to fill a remaining capacity of the first battery module; and the separation mode comprising: identifying a first battery module and a second battery module, the first battery module having an internal resistance relatively higher than an internal resistance of the second battery module; selecting as the selected finite energy source the first battery module when the present load is low-power; and selecting as the selected finite energy source the second battery module when the present load is high-power.

CONCLUSION

Although the techniques have been described in language specific to structural features and/or methodological acts, it is to be understood that the appended claims are not necessarily limited to the features or acts described. Rather, the features and acts are described as example implementations of such techniques.

All of the methods and processes described above can be embodied in, and fully automated via, software code modules executed by one or more general purpose computers or processors. The code modules can be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain embodiments include, while other embodiments do not include, certain features, elements and/or steps. Thus, such conditional language is not generally intended to imply that certain features, elements and/or steps are in any way required for one or more embodiments or that one or more embodiments necessarily include logic for deciding, with or without user input or prompting, whether certain features, elements and/or steps are included or are to be performed in any particular embodiment.

Conjunctive language such as the phrase "at least one of X, Y or Z," unless specifically stated otherwise, is to be understood to present that an item, term, etc. can be either X, Y, or Z, or a combination thereof Any routine descriptions, elements or blocks in the flow charts described herein and/or depicted in the attached figures should be understood as potentially representing modules, segments, or portions of code that include one or more executable instructions for implementing specific logical functions or elements in the routine. Alternate implementations are included within the scope of the embodiments described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described embodiments, the elements of which are to be understood as being among other acceptable examples. All such modifications and variations are intended to be included herein within the scope of this disclosure and protected by the following claims.

What is claimed is:

1. A method comprising:
monitoring at least one energy source characteristic of at least one of a plurality of finite energy sources;
monitoring at least one load characteristic of a present load;
selecting, according to one of a plurality of selection modes, one of the plurality of finite energy sources in response to the monitoring at least one energy source characteristic and the monitoring at least one load characteristic; and
scheduling the present load to the selected finite energy source.

2. The method of claim 1, the plurality of finite energy sources comprising a plurality of battery modules.

3. The method of claim 2, the monitoring at least one energy source characteristic comprising calculating a quantity of energy expended from a first battery module; and
the selecting one of the plurality of finite energy sources comprising:
selecting according to a first selection mode, of the plurality of selection modes, when the quantity of energy expended from the first battery module is less than or equal to a switching threshold; and
selecting according to a second selection mode, of the plurality of selection modes, when the quantity of energy expended from the first battery module is greater than the switching threshold.

4. The method of claim 3, the monitoring at least one load characteristic comprising determining whether the present load is a low-power load or a high-power load;
the first selection mode comprising selecting the first battery module; and
the second selection mode comprising:
selecting the first battery module when the present load is low-power; and
selecting the second battery module when the present load is high-power.

5. The method of claim 2, the monitoring at least one energy source characteristic comprising:
monitoring at least one state of at least one of the plurality of finite energy sources; and
accessing at least one stored characteristic of at least one of the plurality of finite energy sources.

6. The method of claim 5, the at least one state of at least one of the plurality of finite energy sources comprising the value of at least one of an internal resistance, a state of charge, a temperature, an age, or a number of discharge cycles completed of at least one of the plurality of battery modules; and
the at least one stored characteristic of at least one of the plurality of finite energy sources comprising stored information of the internal resistance versus an energy output, stored information of the state of charge versus energy output, an initial internal resistance, or a maximal resistance of at least one of the plurality of battery modules.

7. The method of claim 6 wherein the at least one stored characteristic is augmented or modified in response to a result of a previous application of the method.

8. The method of claim 5, the selecting, according to one of the plurality of selection modes, one of the plurality of finite energy sources further comprising:
calculating an estimated future workload;
assigning a selection mode, of the plurality of selection modes, for the present load
in response to at least one of the estimated future workload, the monitoring at least one energy source characteristic, or the monitoring at least one load characteristic; and
selecting the one of the plurality of finite energy sources according to the assigned selection mode.

9. The method of claim 8, the monitoring at least one load characteristic comprising determining whether the present load is a low-power load or a high-power load;
wherein the assigned selection mode comprises a separation mode, an investment mode, or a reservation mode.

10. The method of claim 9, the investment mode comprising:
applying a greedy algorithm to choose a greedy-preferred battery from the plurality of battery modules;
selecting as the selected finite energy source the greedy-preferred battery when the present load is low-power and the estimated future workload predicts that a presently available position of the greedy-preferred battery will be filled with a low-power load regardless of the present selection; and
selecting as the selected finite energy source a finite energy source other than the greedy-preferred battery when the present load is high-power and the estimated future workload predicts that a presently available position of the greedy-preferred battery will be filled with a high-power load regardless of scheduling decisions.

11. The method of claim 9, the reservation mode comprising:
identifying a first battery module and a second battery module, the first battery module having an internal resistance higher than an internal resistance of the second battery module and a first-battery maximal resistance lower than a second-battery maximal resistance of the second battery; and
selecting as the selected finite energy source the second battery module when the present load is low-power, the ratio of the second-battery maximal resistance to the first-battery maximal resistance exceeds a maximal resistance imbalance threshold, and the estimated future workload predicts a quantity of high-power loads sufficient to fill a remaining capacity of the first battery module.

12. The method of claim 9, the separation mode comprising:
identifying a first battery module and a second battery module, the first battery module having an internal resistance higher than an internal resistance of the second battery module;
selecting as the selected finite energy source the first battery module when the present load is low-power; and
selecting as the selected finite energy source the second battery module when the present load is high-power.

13. A system comprising:
at least one computing device coupled to a plurality of finite energy sources configured to provide power to the at least one computing device;
a battery monitoring module configured to monitor at least one energy source characteristic of at least one of the plurality of finite energy sources;
a load characterization module configured to monitor at least one load characteristic of a present load; and
a load scheduling module configured to:
select, according to one of a plurality of selection modes, one of the plurality of finite energy sources in response to at least one of data provided to the load scheduling module by the battery monitoring module or data provided to the load scheduling module by the load characterization module; and
schedule the present load to the selected finite energy source.

14. A system according to claim 13, the plurality of finite energy sources comprising a plurality of battery modules.

15. A system according to claim 14 wherein:
the battery monitoring module is further configured to:
monitor at least one state of at least one of the plurality of finite energy sources; and
access at least one stored characteristic of at least one of the plurality of energy sources; and
the load scheduling module is further configured to:
calculate an estimated future workload;
assign a selection mode, of the plurality of selection modes, for the present load in response to at least one of the estimated future workload, the data provided by the battery monitoring module, or the data provided by the load characterization module; and
select the one of the plurality of finite energy sources according to the assigned selection mode.

16. A system according to claim 15 wherein the load characterization module is further configured to characterize the present load as a low-power load or a high-power load; and wherein the assigned selection mode comprises a separation mode, an investment mode, or a reservation mode.

17. One or more computer-readable media having computer-executable instructions recorded thereon, the computer-executable instructions configured to, when executed by a computing system associated with a plurality of finite energy sources, cause the computing system to perform operations comprising:
monitoring at least one energy source characteristic of at least one of the plurality of finite energy sources;
monitoring at least one load characteristic of a present load;
selecting, according to one of a plurality of selection modes, one of the plurality of finite energy sources in response to the monitoring at least one energy source characteristic and the monitoring at least one load characteristic; and
scheduling the present load to the selected finite energy source.

18. The computer-readable storage media of claim 17 wherein the monitoring at least one energy source characteristic comprises:
monitoring at least one state of at least one of the plurality of finite energy sources; and
accessing at least one stored characteristic of at least one of the plurality of finite energy sources;
and wherein the selecting, according to one of the plurality of selection modes, one of the plurality of finite energy sources further comprises:
calculating an estimated future workload;
assigning a selection mode, of the plurality of selection modes, for the present load in response to at least one of the estimated future workload, the monitoring at least one energy source characteristic, or the monitoring at least one load characteristic; and
selecting the one of the plurality of finite energy sources according to the assigned selection mode.

19. The computer-readable storage media of claim 18 wherein the monitoring at least one load characteristic comprises determining whether the present load is a low-power or a high-power load;
and wherein the assigned selection mode comprises a separation mode, an investment mode, or a reservation mode.

20. The computer-readable storage media of claim 19,
the plurality of finite energy sources comprising a plurality of battery modules;
the investment mode comprising:
applying a greedy algorithm to choose a greedy-preferred battery from the plurality of battery modules;
selecting as the selected finite energy source the greedy-preferred battery when the present load is low-power and the estimated future workload predicts that a presently available position of the greedy-preferred battery will be filled with a low-power load regardless of the present selection; and
selecting as the selected finite energy source a finite energy source other than the greedy-preferred battery when the present load is high-power and the estimated future workload predicts that a presently available position of the greedy-preferred battery will be filled with a high-power load regardless of scheduling decisions;

the reservation mode comprising:
  identifying a first battery module and a second battery module, the first battery module having an internal resistance higher than an internal resistance of the second battery module and a first-battery maximal resistance lower than a second-battery maximal resistance of the second battery; and
  selecting as the selected finite energy source the second battery module when the present load is low-power, the ratio of the second-battery maximal resistance to the first-battery maximal resistance exceeds a maximal resistance imbalance threshold, and the estimated future workload predicts a quantity of high-power loads sufficient to fill a remaining capacity of the first battery module; and the separation mode comprising:
  identifying a first battery module and a second battery module, the first battery module having an internal resistance relatively higher than an internal resistance of the second battery module;
  selecting as the selected finite energy source the first battery module when the present load is low-power; and
  selecting as the selected finite energy source the second battery module when the present load is high-power.

\* \* \* \* \*